United States Patent
Li et al.

(10) Patent No.: US 9,040,653 B2
(45) Date of Patent: *May 26, 2015

(54) RING-OPENING POLYMERIZATION OF CYCLIC COMPOUNDS CATALYZED BY CARBENE DERIVATIVES

(75) Inventors: Zhenjiang Li, Nanjing (CN); Pingkai Ouyang, Nanjing (CN); He Huang, Nanjing (CN)

(73) Assignee: NANJING UNIVERSITY OF TECHNOLOGY, Nanjing, Jiangsu (CN)

(*) Notice: Subject to any disclaimer, the term of this patent is extended or adjusted under 35 U.S.C. 154(b) by 285 days.

This patent is subject to a terminal disclaimer.

(21) Appl. No.: 13/034,620

(22) Filed: Feb. 24, 2011

(65) Prior Publication Data

US 2011/0144296 A1     Jun. 16, 2011

Related U.S. Application Data

(63) Continuation-in-part of application No. PCT/CN2009/073675, filed on Sep. 1, 2009.

(30) Foreign Application Priority Data

Sep. 1, 2008 (CN) .......................... 2008 1 0146619

(51) Int. Cl.
    *C08G 63/08*     (2006.01)
    *C08G 69/16*     (2006.01)
    (Continued)

(52) U.S. Cl.
    CPC ................ *C08G 63/08* (2013.01); *B01J 31/40* (2013.01); *C08G 63/785* (2013.01);
    (Continued)

(58) Field of Classification Search
    USPC .................................................. 528/354–359
    See application file for complete search history.

(56) References Cited

U.S. PATENT DOCUMENTS 3,736,646 A    6/1973   Schmitt et al.
4,045,418 A    8/1977   Sinclair
(Continued)

FOREIGN PATENT DOCUMENTS

CN     1325913     12/2001
CN     1544504     11/2004
(Continued)

OTHER PUBLICATIONS

Osanai et al (Transformation of Biodegradable Polyesters into Cyclic Oligomers under Continuous Flow Using an Enzyme-Packed Column, Macromol. Biosci. 2004, 4, 936-942).*
(Continued)

*Primary Examiner* — Rachel Kahn
(74) *Attorney, Agent, or Firm* — Novick, Kim & Lee, PLLC; Allen Xue (57) ABSTRACT

This disclosure provides methods of controlled polymerization of cyclic compounds catalyzed by carbene derivatives having a general formula as shown below, and to obtain a biodegradable polymeric material having a large molecular weight, a narrow dispersity, and no metallic impurity.

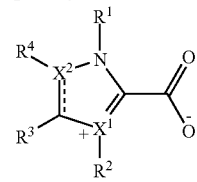

15 Claims, 4 Drawing Sheets (51) Int. Cl.
| | |
|---|---|
| B01J 31/40 | (2006.01) |
| C08G 63/78 | (2006.01) |
| C08G 63/82 | (2006.01) |
| C08G 65/26 | (2006.01) |
| C08G 69/20 | (2006.01) |
| C08G 77/08 | (2006.01) |
| B01J 31/04 | (2006.01) |

(52) U.S. Cl.
CPC ......... *C08G 63/823* (2013.01); *C08G 65/2609* (2013.01); *C08G 65/2672* (2013.01); *C08G 69/20* (2013.01); *B01J 31/04* (2013.01); *C08G 77/08* (2013.01)

(56) References Cited

U.S. PATENT DOCUMENTS

| | | | |
|---|---|---|---|
| 4,057,537 | A | 11/1977 | Sinclair |
| 5,235,031 | A | 8/1993 | Drysdale et al. |
| 5,357,034 | A | 10/1994 | Fridman et al. |
| 5,574,129 | A | 11/1996 | Miyoshi et al. |
| 5,696,219 | A | 12/1997 | Jallouli et al. |
| 6,569,989 | B2 | 5/2003 | Ohara et al. |
| 6,875,839 | B2 | 4/2005 | Gerking et al. |
| 7,772,350 | B2 | 8/2010 | Blanc-Magnard et al. |
| 2006/0100365 | A1 | 5/2006 | Tam et al. |
| 2007/0252311 | A1 | 11/2007 | Tam et al. |

FOREIGN PATENT DOCUMENTS

| | | |
|---|---|---|
| CN | 1814644 | 8/2006 |
| CN | 1814645 | 8/2006 |
| JP | 7304859 A | 11/1995 |
| JP | 2850101 B2 | 1/1999 |
| JP | 2002300898 | 10/2002 |

OTHER PUBLICATIONS

Jeong et al (N-Heterocyclic Carbene Organocatalysts for the Preparation of Biocompatible and Biodegradable Polyesters, PMSE Preprints, 95, p. 1026, 2006).*
"molten, adj." OED Online. Oxford University Press, Mar. 2014. Web. Mar. 18, 2014.*
"melt, v.1." OED Online. Oxford University Press, Mar. 2014. Web. Mar. 18, 2014.*
Coulembier et al (Bulk Polymerization of (L,L)Lactide Using Non-Organometallic Triazolium Carbene: Limited Advantages, The Open Macromolecules Journal Jan. 2007; 1(1):1-5).*
Takahashi et al (Lipase-Catalyzed Transformation of Poly(lactic acid) into Cyclic Oligomers, Macromol. Biosci. 2004, 4, 346-353).*
Conner et al., "First Example of N-Heterocyclic Carbenes as Catalysts for Living Polymerization: Organocatalytic Ring-Opening Polymerization of Cyclic Esters," Journal of the American Chemical Society, 2002, 124, 914-915.
Duong et al., "Reversible carboxylation of N-heterocyclic carbenes," Chemical Communications, 2004, 112-113.
Tudose et al., "Imidazol(in)ium-2-carboxylates as N-heterocyclic carbene precursors in ruthenium—arene catalysts for olefin metathesis and cyclopropanation," Journal of Organometallic Chemistry, 2006, 691, 5356-5365.
Jacobsen et al., "Single-step reactive extrusion of PLLA in a corotating twin-screw extruder promoted by 2-ethylhexanoic acid tin(II) salt and triphenylphosphine," Polymer, 2000, 41(9), 3395-3403.
Nederberg et al., "New Paradigms for Organic Catalysts: The First Organocatalytic Living Polymerization," Angewandte Chemie International Edition, 2001, 40, 2712-2715.
Nyce et al., "In Situ Generation of Carbenes: A General and Versatile Platform for Organocatalytic Living Polymerization," Journal of the American Chemical Society, 2003, 125, 3046-3056.
Nyce et al., "A General and Versatile Approach to Thermally Generated N-Heterocyclic Carbenes," Chemistry-A European Journal, 2004, 10, 4073-4079.
Csihony et al., "Single-Component Catalyst/Initiators for the Organocatalytic Ring-Opening Polymerization of Lactide," Journal of the American Chemical Society, 2005, 127, 9079-9084.
Holbrey et al., "1,3-Dimethylimidazolium-2-carboxylate: the unexpected synthesis of an ionic liquid precursor and carbene-CO2 adduct," Chemical Communications, 2003, 28-29.
Voutchkova et al., "Disubstituted Imidazolium-2-Carboxylates as Efficient Precursors to N-Heterocyclic Carbene Complexes of Rh, Ru, Ir, and Pd," Journal of the American Chemical Society, 2005, 127, 17624-17625.
Tudose et al., "Imidazol(in)ium carboxylates as N-heterocyclic carbene ligand precursors for Suzuki—Miyaura reactions," Tetrahedron Letters, 2006, 47, 8529-8533.
Tudose et al., Journal of Organometallic Chemistry, 2006, 691, 5356-5365.
Kato et al., "Enzymatic Synthesis of Polythioester by the Ring-Opening Polymerization of Cyclic Thioester," Biomacromolecules, 2007, 8, 3590-3596.
Coulembier et al., "From controlled ring-opening polymerization to biodegradable aliphatic polyester: Especially poly(b-malic acid) derivatives," Progress in Polymer Science, 2006, 31, 723-747.
Dove et al., "N-Heterocyclic carbenes: Effective organic catalysts for living polymerization," Polymer, 2006, 47, 4018-4025.
Culkin et al., "Zwitterionic Polymerization of Lactide to Cyclic Poly(Lactide) by Using N-Heterocyclic Carbene Organocatalysts," Angewandte Chemie International Edition, 2007, 46, 2627-2630.
Csihony et al., "Bredereck's Reagent Revisited: Latent Anionic Ring-Opening Polymerization and Transesterification Reactions," Advanced Synthesis and Catalysis, 2004, 346, 1081-1086.
Coulembier et al., "Latent, Thermally Activated Organic Catalysts for the On-Demand Living Polymerization of Lactide," Angewandte Chemie International Edition, 2005, 44, 4964-4968.

* cited by examiner

RING-OPENING POLYMERIZATION OF CYCLIC COMPOUNDS CATALYZED BY CARBENE DERIVATIVES

CROSS-REFERENCES TO RELATED APPLICATIONS

This application is a continuation-in-part of International Application No. PCT/CN2009/073675, filed Sep. 1, 2009, which claims the benefit of Chinese Patent Application No. 200810146619.8, filed Sep. 1, 2008.

TECHNICAL FIELD

The current invention relates to the field of polymeric materials, involving the ring-opening polymerization of a variety of cyclic compounds (including cyclic monomer and cyclic oligomers of low molecular weight) that synthesize polymers having high the molecular weight and low dispersity, particularly involving using carbene derivatives to catalyze the ring-opening polymerization of cyclic compounds to obtain polymeric materials.

BACKGROUND

Currently, most of the polymers that we use in our daily life, such as polystyrene, polyolefins, PVC, etc., are difficult to degrade in nature. They caused serious pollution to the environment. Biodegradable polyester polymeric materials has far-reaching significances. Aliphatic polyester polymer is degradable gradually in water, enzymatic or microbial environment, which can help solve the increasingly serious environmental problem. Small molecule compounds produced by the degradation can be recycled and reused, easing the world energy shortage crisis. Aliphatic polyester has good biocompatibility and has no significant toxicity and are not rejected by the living organisms, which can be used in the biomedical field. New methods for manufacturing polyester are in need.

BRIEF SUMMARY OF THE DISCLOSURE

This disclosure provides a method of controlled ring-opening polymerization of cyclic compounds using carbene derivatives, obtaining biodegradable polymeric materials that are of high molecular weight, narrow polydispersity, and contain no metallic impurities.

The method disclosed herein utilizes carbon dioxide adducts of carbenes, which, under certain conditions, can release the carboxyl group at the 2-position to generate corresponding carbenes, so that the adducts act as a carbene transfer reagent. The adducts are used as the catalysts for ring-opening polymerization of cyclic compounds.

This disclosure also discovered that different substituents on the heterocyclic rings of the carbon dioxide adducts affects the decarboxylation temperature at the 2-position. While the ring-opening polymerization of the cyclic compound requires a suitable reaction temperature and its range of variation based on the requirements on the property of polymers and the polymerization process conditions. To ensure that the decarboxylation of $CO_2$ adducts of carbenes occur in the same temperature range of the ring-opening polymerization, so that to produce active catalyst to promote the catalytic reaction, thermal gravimetric analysis were conducted on $CO_2$ adducts of carbenes having different substituents on the structure of carbenes. The temperature and rate of decarboxylation of $CO_2$ adducts of carbenes of various structure were obtained. Among them, a group of suitable catalysts were chosen so that the decarboxylation temperature and the reaction temperature of lactide ring-opening polymerization can properly match. Under the suitable reaction temperature, the catalytic ring-opening polymerization can be effectively carried out. Therefore, through controlling its reaction temperature, lactide ring-opening polymerization catalyzed by $CO_2$ adducts of carbenes becomes controllable.

In addition, $CO_2$ adducts of carbenes are purely organic catalysts, catalyzing ring-opening polymerization of cyclic compounds to get polymers without any metallic residue. Such polymers can be widely applied in various fields. The carbon dioxide are released from the reaction system, which leaves no impurities.

The terminal structure and the molecular weight can be controlled by adding an reagent having active hydrogen (ROH) as an initiator in the ring-opening polymerization reaction. The terminal structure of the obtained polymer are RO— and —OH respectively. While the ratio of the cyclic compound and initiator determines the target molecular weight of the polymer. When an initiator is used, N-heterocyclic carbene catalyzed ring-opening polymerization of cyclic compounds is a living polymerization, resulting in polymers with a relatively narrow molecular weight distribution.

This disclosure provides a method of making polylactic acid using $CO_2$ adducts of carbenes as the catalyst, wherein the adduct has a structure represented by formula (I):

(I)

wherein the dotted line together with the solid line parallel to the dotted line represents a single bond or a double bond; $X^1$ is chosen from S and N; $X^2$ is chosen from C and N; $R^1$ and $R^2$ can be the same or different and are chosen from
  hydrogen,
  alkyl groups having 1 to 10 carbon atoms,
  alkyl groups having 1 to 10 carbon atoms and also having one or more substituents chosen from halogens, a hydroxyl group, a phenyl group, and a cyano group,
    cycloalkyl groups having 3 to 6 carbon atoms,
    a halogen atom,
    an adamantane group,
    a phenyl group, and
    a phenyl group having one or more substituents chosen from halogens, a hydroxyl group, an alkyl group, and a cyano group;
$R^3$ and $R^4$ can be the same or different and are chosen from
  hydrogen,
  a halogen atom,
  a cyano group,
  a hydroxyl group,
  alkyl groups having 1 to 4 carbon atoms,
  alkyl groups having 1 to 4 carbon atoms and also having one or more substituents chosen from halogens, a hydroxyl group, a phenyl group, and a cyano group,
    a phenyl group, and
    a substituted phenyl group.
  Alternatively, $R^3$ and $R^4$ are connected to form cycloalkyl or cycloalkenyl rings having 3 to 8 carbon atoms fused to the five-membered ring that contains $X_1$, $X_2$, and the nitrogen atom (in which case $X_2$ and the carbon atom in the 5-membered ring next to $X_2$ are also part of said cycloalkyl or cycloalkenyl rings); or $R^3$ and $R^4$ are connected to form a benzene ring fused to the five-membered ring that contains $X_1$, $X_2$, and the nitrogen atom (in which case $X_2$ and the carbon atom in the 5-membered ring next to $X_2$ are also part of said benzene ring); or $R^2$ and $R^3$ are connected to form 5-membered or 6-membered N-heterocyclic rings having no substituent, which are fused to the five-membered ring that contains $X_1$, $X_2$, and the nitrogen atom (in which case $X_1$ and the carbon atom in the 5-membered ring connected to $R^3$ are also part of said benzene ring).

Specific structure of the adducts of formula (I) can be of formula (II), formula (III), formula (IV), and formula (V).

In formula (II), $R^1$ and $R^2$ can be the same or different and are chosen from
hydrogen,
alkyl groups having 1 to 10 carbon atoms,
alkyl groups having 1 to 10 carbon atoms and also having one or more substituents chosen from halogens, a hydroxyl group, a phenyl group, and a cyano group,
cycloalkyl groups having 3 to 6 carbon atoms,
a halogen atom,
an adamantane group,
a phenyl group, and
a substituted phenyl group;
$R^3$ and $R^4$ can be the same or different and are chosen from
hydrogen,
a halogen atom,
a cyano group,
a hydroxyl group,
alkyl groups having 1 to 4 carbon atoms,
alkyl groups having 1 to 4 carbon atoms and also having one or more substituents chosen from halogens, a hydroxyl group, a phenyl group, and a cyano group,
a phenyl group, and
a substituted phenyl group.

Alternatively, $R^3$ and $R^4$ are connected to form cycloalkyl or cycloalkenyl rings having 3 to 8 carbon atoms fused to the five-membered ring that contains $X_1$, $X_2$, and the nitrogen atom (in which case $X_2$ and the carbon atom in the 5-membered ring next to $X_2$ are also part of said cycloalkyl or cycloalkenyl rings), or $R^3$ and $R^4$ are connected to form a benzene ring fused to the five-membered ring that contains $X_1$, $X_2$, and the nitrogen atom (in which case $X_2$ and the carbon atom in the 5-membered ring next to $X_2$ are also part of said benzene ring).

In formula (III), $R^1$ and $R^2$ can be the same or different and are chosen from
hydrogen,
alkyl groups having 1 to 10 carbon atoms,
alkyl groups having 1 to 10 carbon atoms and also having one or more substituents chosen from halogens, a hydroxyl group, a phenyl group, and a cyano group,
cycloalkyl groups having 3 to 6 carbon atoms,
a halogen atom,
an adamantane group,
a phenyl group, and
a substituted phenyl group;
$R^3$ and $R^4$ can be the same or different and are chosen from
hydrogen,
a halogen atom,
a cyano group,
a hydroxyl group,
alkyl groups having 1 to 4 carbon atoms,
alkyl groups having 1 to 4 carbon atoms and also having one or more substituents chosen from halogens, a hydroxyl group, a phenyl group, and a cyano group,t
a phenyl group, and
a substituted phenyl group.

Alternatively, $R^3$ and $R^4$ are connected to form cycloalkyl or cycloalkenyl rings having 3 to 8 carbon atoms fused to the five-membered ring that contains $X_1$, $X_2$, and the nitrogen atom (in which case $X_2$ and the carbon atom in the 5-membered ring next to $X_2$ are also part of said cycloalkyl or cycloalkenyl rings).

In formula (IV), $R^1$ is chosen from
hydrogen,
alkyl groups having 1 to 10 carbon atoms,
alkyl groups having 1 to 10 carbon atoms and also having one or more substituents chosen from halogens, a hydroxyl group, a phenyl group, and a cyano group,
cycloalkyl groups having 3 to 6 carbon atoms,
a halogen atom,
an adamantane group,
a phenyl group, and
a substituted phenyl group;
$R^3$ and $R^4$ can be the same or different and are chosen from
hydrogen,
a halogen atom,
a cyano group,
a hydroxyl group,
alkyl groups having 1 to 4 carbon atoms,
alkyl groups having 1 to 4 carbon atoms and also having one or more substituents chosen from halogens, a hydroxyl group, a phenyl group, and a cyano group,
a phenyl group, and
a substituted phenyl group.

Alternatively, $R^3$ and $R^4$ are connected to form cycloalkyl or cycloalkenyl rings having 3 to 8 carbon atoms fused to the five-membered ring that contains $X_1$, $X_2$, and the nitrogen atom (in which case $X_2$ and the carbon atom in the 5-membered ring next to $X_2$ are also part of said cycloalkyl or cycloalkenyl rings), or $R^3$ and $R^4$ are connected to form a benzene ring fused to the five-membered ring that contains $X_1$, $X_2$, and the nitrogen atom (in which case $X_2$ and the carbon atom in the 5-membered ring next to $X_2$ are also part of said benzene ring).

In formula (V), $R^1$ and $R^2$ can be the same or different and are chosen from hydrogen, alkyl groups having 1 to 10 carbon atoms, alkyl groups having 1 to 10 carbon atoms and also having one or more substituents chosen from halogens, a hydroxyl group, a phenyl group, and a cyano group, cycloalkyl groups having 3 to 6 carbon atoms, a halogen atom, an adamantane group, a phenyl group, and a substituted phenyl group;

$R^3$ is chosen from hydrogen, a halogen atom, a cyano group, a hydroxyl group, alkyl groups having 1 to 4 carbon atoms, alkyl groups having 1 to 4 carbon atoms and also having one or more substituents chosen from halogens, a hydroxyl group, a phenyl group, and a cyano group, a phenyl group, and a substituted phenyl group;

alternatively, $R^2$ and $R^3$ are connected to form 5-membered or 6-membered N-heterocyclic rings having no substituent, which are fused to the five-membered ring that contains $X_1$, $X_2$, and the nitrogen atom (in which case $X_1$ and the carbon atom in the 5-membered ring connected to $R^3$ are also part of said benzene ring).

The above-described substituted phenyl group can have one, two, or three substituents. The substituents can be the same or different, chosen from halogen atom, a hydroxyl group, an alkoxy group, and a cyano group, alkyl groups having 1-5 carbon atoms, and alkyl groups having 1-5 carbon atoms and have one or more substituents chosen from halogens, a hydroxyl group, a phenyl group, and a cyano group.

In the above-described method controlled ring-opening polymerization of cyclic compounds, cyclic compounds can be chosen from one or more of the following monomers:

(1)

wherein A is [—$(CR^1R^{2)}$—]$_n$, n is an integer from 2 to 10; $R^1$ and $R^2$ are the same or different and are chosen from H, alkyl groups with 1 to 5 carbon atoms, and alkyl groups with 1 to 5 carbon atoms and having substituents chosen from halogens or a hydroxyl group. X is chosen from O and N;

(2)

wherein A and B are [—$(CR^1R^{2)}$—]$_n$, n is an integer from 2 to 10, A and B can be the same or different. $R^1$ and $R^2$ are the same or different and are chosen from H, alkyl groups with 1 to 5 carbon atoms, and alkyl groups with 1 to 5 carbon atoms and having substituents chosen from halogens or a hydroxyl group. X is chosen from O and NH.

(3)

or cyclic compounds having 2 to 5 structural units wherein A is [—$(CR^1R^2)$—]$_n$, n is an integer from 2 to 10; $R^1$ and $R^2$ are the same or different and are chosen from H, alkyl groups with 1 to 5 carbon atoms, and alkyl groups with 1 to 5 carbon atoms and having substituents chosen from halogens or a hydroxyl group. X is chosen from O, N and S.

(4)

wherein A is [—$(CR_1R^2)$—]$_n$, n is an integer from 2 to 10; $R^1$ and $R^2$ are the same or different and are chosen from H, alkyl groups with 1 to 5 carbon atoms, and alkyl groups with 1 to 5 carbon atoms and having substituents chosen from halogens or a hydroxyl group. B is chosen from $CH_2$—O—$CH_2$, $CH_2$, and C=O. $X^1$ and $X^2$ are the same or different and are chosen from O, N, S, and Si.

The cyclic compound may also be a macrocylic oligomer obtained by pre-polymerization of one or more cyclic monomers (1) to (4), and the macrocyclic oligomer contains 3 to 20 monomers.

In the above-described method of controlled ring-opening polymerization, the molar ratio of $CO_2$ adduct of carbene and the cyclic compound is 1:50 to 1000, preferably 1:50 to 800, more preferably 1:50 to 500. The method may also employ an initiator. The molar ratio of the initiator and the cyclic compound is 1:2 to 10000, preferably 1:50 to 1000, more preferably 1:50 to 500. A suitable temperature range is −50 to 200° C., preferably 60 to 180° C., more preferably 100~160° C., when the carbene is released to catalyze the ring-opening polymerization of cyclic compounds. The polymerization reaction time can range from 3 seconds to 120 hours, preferably 5 minutes to 10 hours, more preferably 5 minutes to 4 hours.

The above-described initiator may be an alcohol compound, preferably methanol, ethanol, propanol, isopropanol, n-butanol, tert-butyl alcohol, benzyl alcohol, benzyl alcohol, phenylethyl alcohol, ethylene glycol, diethylene glycol, pentaerythritol, more preferably n-butanol, benzyl alcohol, and phenylethyl alcohol.

The above-described method of controlled ring-opening polymerization can be carried out in solvent as well as under solvent-free conditions. The solvent preferably has a boiling point that is higher than the temperature of polymerization.

The disclosure also provides the utility of $CO_2$ adducts of carbenes in the preparation of catalyst used in ring-opening polymerization of cyclic compounds.

The beneficial effects of the present disclosure are as follows:

1. Utilizing the nucleophilicity of the N-heterocyclic carbene nucleophilic and its high catalytic activity in ring-opening polymerization, one can selectively choose to activate certain monomer and then proceed to chain growth, which ensures the living polymerization of cyclic compounds.

2. The $CO_2$ adducts of carbene can be stored at room temperature using conventional methods. The adducts are stable and can avoid troubles in storing and using carbene.

3. The $CO_2$ adducts of carbene is heated to activate carbenes and $CO_2$ is vented from the reaction system. In addition, the $CO_2$ adducts of carbene is a purely organic catalyst, replacing conventional metallic catalysts, making it possible to have no metallic residue in the polymer product.

4. The decarboxylation temperature of $CO_2$ adducts of carbene is affected by the substituents on its ring. Therefore, one may choose suitable $CO_2$ adducts of carbenes as the catalyst based on the desired temperature for the polymerization reaction. In this way, the polymerization process can be better controlled.

5. Using $CO_2$ adducts of carbene as the catalyst, the ring-opening polymerization of cyclic compounds can be carried out under solvent-free conditions. It realizes cost-saving as well as simplifies the post-reaction treatment process. In addition, this reaction can be carried out in the reactive extruder to accomplish large-scale preparations of polyester.

6. Carbon dioxide adducts of carbene can be a common catalyst for ring-opening reactions of a variety of cyclic compounds.

BRIEF DESCRIPTION OF THE DRAWINGS

Examples of this disclosure are described in details with reference to the drawings in the following.

DETAILED DESCRIPTION

The following examples are provided for the purpose of illustration and in no way limit the disclosure. One of ordinary skill in the art would appreciate that these examples do not limit the present disclosure in any aspects, and that appropriate modification and adjustment of the parameters can be made without violating the essence of this disclosure and deviation from the scope of the present disclosure.

Figure 1:
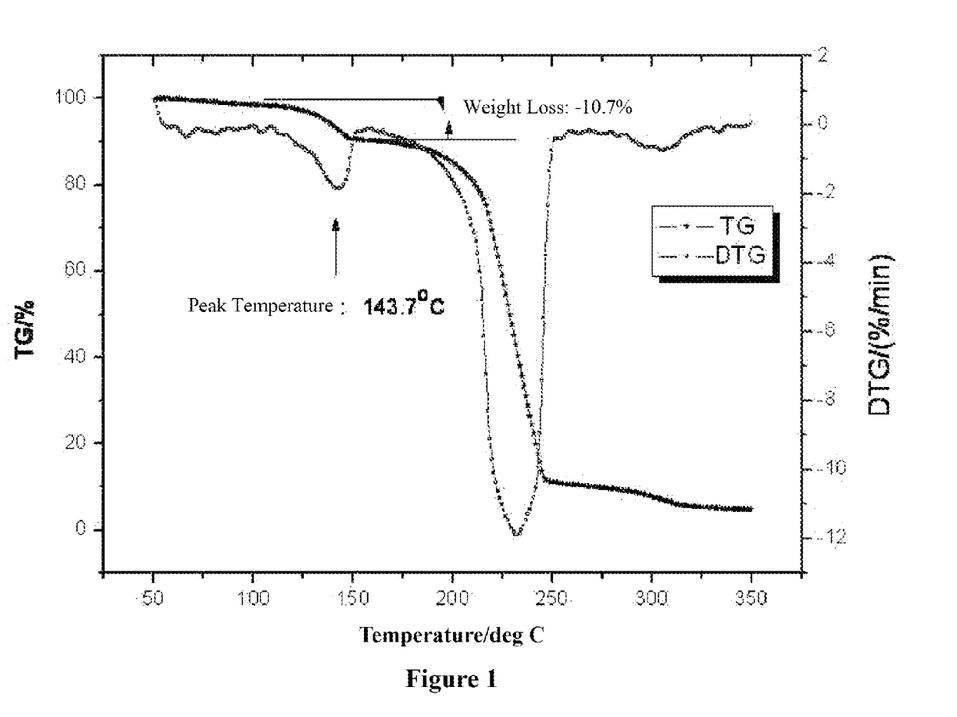
FIG. 1: A TGA graph of a salt of 1,3-bis(2,6-diisopropyl-phenyl)imidazole-2-carboxylic.
Figure 2:
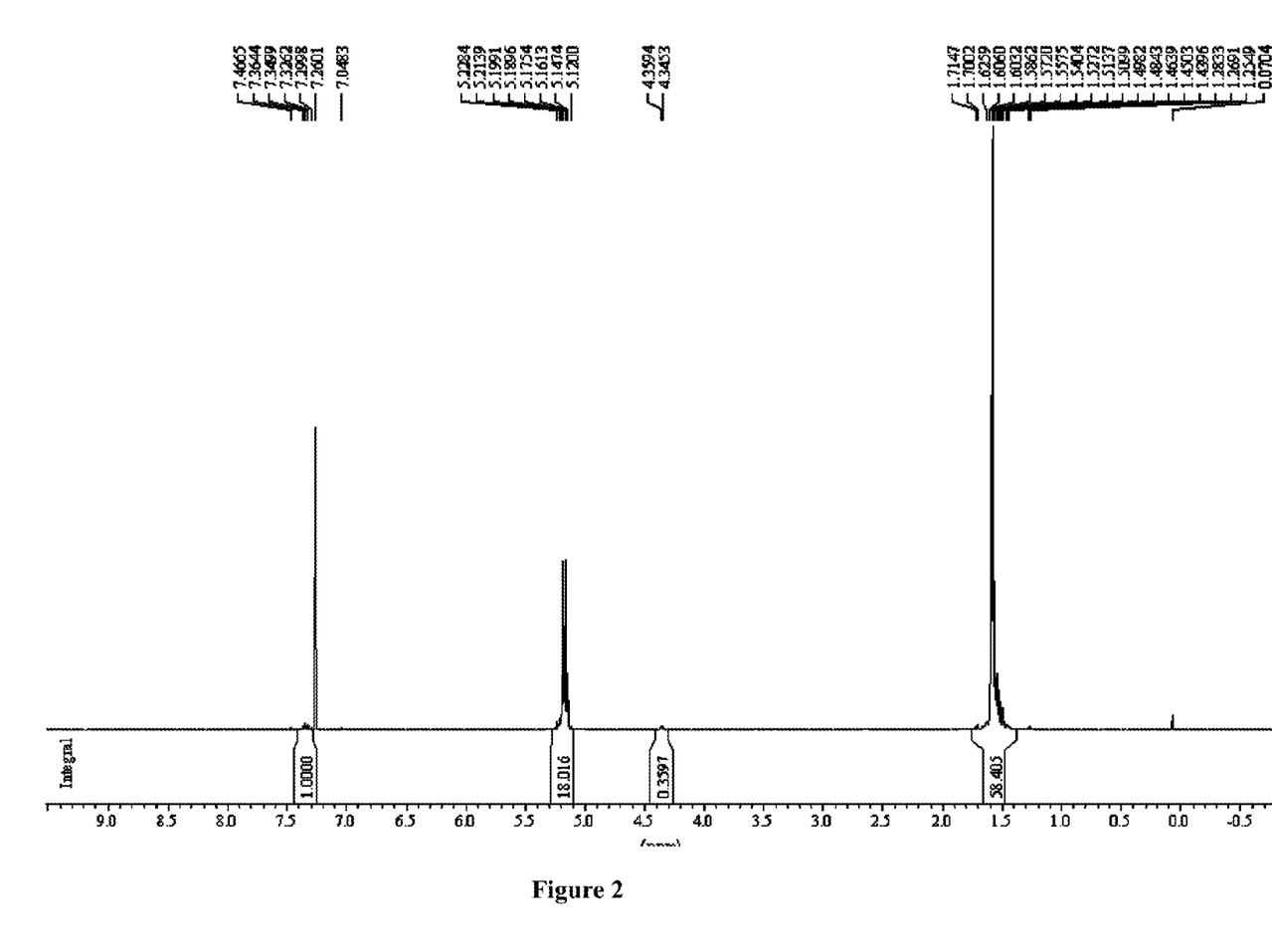
FIG. 2: A $^1$H NMR spectrum of polylactic acid prepared using a salt of 1,3-bis(2,6-diisopropyl-phenyl)imidazole-2-carboxylic as the catalyst.
Figure 3:
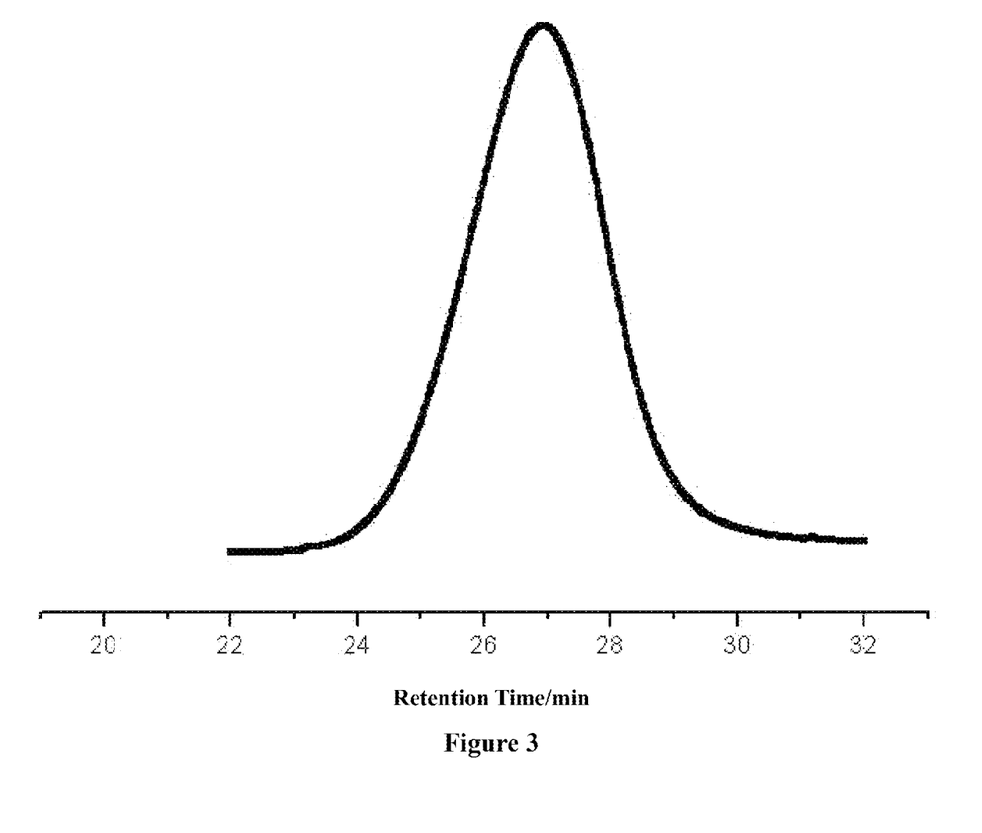
FIG. 3: A chromatogram of size-exclusion chromatography of polylactic acid prepared using a salt of 1,3-bis(2,6-diisopropyl-phenyl)imidazole-2-carboxylic acid as the catalyst.

The range of decarboxylation temperature in this disclosure was obtained using TGA analysis. The equipment and test conditions were: TG/DTA (NETZSCHSTA449C), $N_2$ protection, heating rate 5° C./min, temperature range 50 to 350° C. Using the salt of 1,3-bis(2,6-diisopropyl-phenyl)imidazole-2-carboxylic acid as an example, its TG/DTG graph is in FIG. 1. The vacuum referred to in the Examples are all in absolute pressure.

The reaction conversion was measured using $^1$H NMR. The equipment and test conditions were: NMR (Bruker DRX500), solvents were d-$CHCl_3$, d-DMSO or d-$CH_3COCH_3$. The average molecular weight of polylactic acid and the dispersion were determined using size-exclusion chromatography (SEC), the test conditions are: column temperature: 25° C., solvent: THF (HPLC), flow rate: 1 mL/min, HPLC Pump: Waters 515, Detector: RI (Wyatt Optilab rEX), column: HR3, HR4, and HR5 Styragel connected in series, standard sample: polystyrene (PS) $M_W$=900 to $1.74 \times 10^6$ g/mol, PDI<1.1.

Example 1

1,3-bis(2,6-diisopropyl-phenyl)imidazole-2-carboxylic acid salt (29 mg, 75 μmol), benzyl alcohol (5.4 mg, 50 μmol), ε-caprolactone (1.44 g, 10 mmol) were dissolved in 10 mL of xylene. The solution was heated under the protection of the $N_2$ to 140° C., and reacted for 3 seconds. Formic acid was added to terminate the reaction. The reaction solution was added into methanol. The precipitate filtered and dried to a constant weight, getting 0.8 gram poly ε-caprolactone. The conversion rate was 72%. The number average molecular weight $M_n$ was 19,000. The polydispersity index PDI was 1.06.

The structure of the catalyst and the structure of the cyclic compound are as follows:

1,3-bis(2,6-diisopropyl-phenyl) imidazole-2-carboxylic acid salt

ε-caprolactone

Example 2

1,3-bis(2,6-diisopropyl-phenyl)imidazole-2-carboxylic acid salt (108.07 mg, 250 μmol), benzyl alcohol (5.4 mg, 50 μmol), L-lactide (0.72 g, 12.5 mmol) were added into a reaction vessel, heated under the protection of the Ar to 130° C. The reaction in the molten mixture was carried out for 30 minutes. The reaction was terminated by adding water. The reaction mixture was dissolved in chloroform and then added into ethanol. The precipitate was filtered and dried to a constant weight, obtaining 0.6 g of poly L-lactic acid. The conversion was 89%. The number average molecular weight of the polylactic acid $M_n$ was 29,000. The polydispersity index PDI was 1.15.

The structure of the catalyst and the structure of the cyclic compound are as follows:

,3-bis(2,6-diisopropyl-phenyl) imidazole-2-carboxylic acid salt

Lactide

Example 3

1-butyl-3-methylimidazolium-2-carboxylic acid salt (18.21 mg, 100 μmol), n-butanol (7.41 mg, 100 μmol), 3,6-dimethyl-1,4-dioxane-2,5-dione (5.72 g, 40 mmol) were added into a reaction vessel. The reaction vessel was under vacuum at a pressure of 7 mmHg. The reaction was carried out at 50° C. for 3 hours. The reaction was terminated by adding hydrochloric acid. The reaction mixture was dissolved with dichloromethane, then added into ethanol. The precipitate was filtered and dried to a constant weight, obtaining 3.6 g of white poly-3,6-dimethyl-1,4-dioxane-2,5-dione. The conversion was 65%. The number average molecular weight of the polylactic acid $M_n$ was 36,000. The polydispersity index PDI was 1.34.

The structure of the catalyst and the structure of the cyclic compound are as follows:

1-butyl-3-methylimidazolium-2-carboxylic acid salt 3,6-dimethyl-1,4-dioxane-2,5-dione

Example 4

1,3-bis(2,6-diisopropyl-phenyl)imidazoline-2-carboxylic acid salt (32.6 mg, 75 μmol), methanol (32.0 mg, 1 mmol), δ-valerolactone (0.50 g, 5 mmol) was added into a reaction vessel and dissolved in 30 mL of THF. The solution was heated under the protection of Ar to 60° C., stirred and let react for 3 days.

The reaction was terminated by adding benzoic acid. The reaction mixed was condensed and added into methanol. The precipitate was filtered and dried to a constant weight to obtain 0.43 g of poly δ-valerolactone. The conversion was 91%. The number average molecular weight of the polylactic $M_n$ was 500. The polydispersity index was PDI 1.00.

The structure of the catalyst and the structure of the cyclic compound are as follows:

1,3-bis(2,6-diisopropyl-phenyl) imidazoline-2-carboxylic acid salt

δ-valerolactone

Example 5

Figure 4:
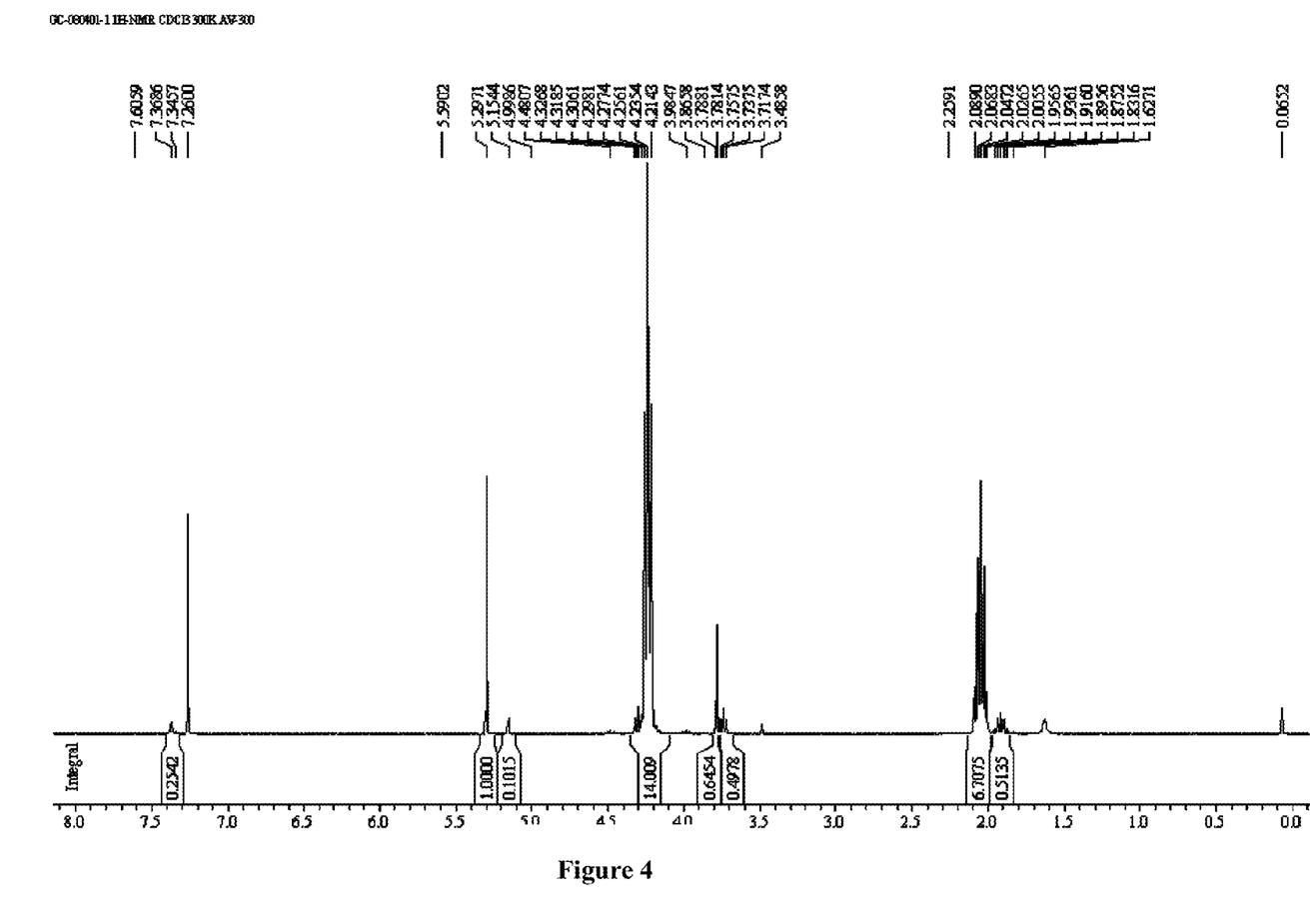
FIG. 4: A $^1$H NMR spectrum of poly trimethylene carbonate prepared using a salt of 1-butyl-3-methylimidazolium-2-carboxylic acid as the catalyst.

1-butyl-3-methylimidazolium-2-carboxylic acid salt (13.66 mg, 75 μmol), benzyl alcohol (10.8 mg, 100 μmol), trimethylene carbonate (2.04 g, 20 mmol) were added into a reaction vessel. The reaction vessel was under vacuum at a pressure of 7 mmHg. The reaction was carried out at −50° C. for 5 days. The reaction was terminated by adding water. The reaction mixture was dissolved in toluene. The solution was added into ethanol. The precipitate was filtered and dried to a constant weight, obtaining 1.2 g of poly trimethylene carbonate. The conversion was 71% conversion. The number average molecular weight $M_n$ was 16,500. The polydispersity index PDI was 1.45. See FIG. 4 for a $^1H$ NMR spectrum of the obtained poly trimethylene carbonate.

The structure of the catalyst and the structure of the cyclic compound are as follows:

1-butyl-3-methylimidazolium-2-carboxylic acid salt

TMC

Example 6

1,3-dimethyl imidazole-2-carboxylic acid salt (10.5 mg, 75 μmol), ethylene glycol (3.32 mg, 37.5 μmol), trimethylene carbonate (2.04 g, 20 mmol) and ε-caprolactone (1.14 g, 10 mmol) added into a reaction vessel. The mixture was heated under the protection of the Ar to 96° C. The reaction in the molten mixture was carried out for 2 hours. The reaction was terminated by adding $CS_2$. The reaction mixture was dissolved in chloroform. The solution was then added into methanol. The precipitate was filtered and dried to a constant weight to obtain 2.3 g of a copolymer of trimethylene carbonate and ε-caprolactone. The molar ratio of trimethylene carbonate and ε-caprolactone is 3:1. The number average molecular weight $M_n$ as 79,500. The polydispersity index PDI was 1.25.

The structure of the catalyst and the structure of the cyclic compound are as follows:

1,3-dimethyl imidazole-2-  TMC  ε-caprolactone
carboxylic acid salt

Lactide  δ-valerolactone

Example 7

1,3-bis(2,4,6-trimethyl-phenyl)imidazoline-2-carboxylic acid salt (32.6 mg, 75 μmol), benzene, ethanol (9.16 mg, 75 μmol), D-lactide (1.44 g, 10 mmol) were added into a reaction vessel. The reaction vessel was under vacuum of at a pressure of 4 mm Hg. The reaction was carried out at −30° C. for 4 days. The reaction was terminated by adding oxygen. The reaction mixture was dissolved in chloroform and then added into ethanol. The precipitate was filtered and dried to a constant weight to obtain 0.4 g poly D-lactic acid. The conversion was 32%. The number average molecular weight $M_n$ was 9,580. The polydispersity index PDI was 1.27.

The structure of the catalyst and the structure of the cyclic compound are as follows:

1,3-bis(2,4,6-trimethyl-phenyl)  Lactide
imidazoline-2-carboxylic acid salt

Example 8

1,3-bis(2,4,6-trimethyl-phenyl)imidazole-2-carboxylic acid salt (32.6 mg, 75 μmol), isopropanol (9.01 mg, 150 μmol), L-lactide (1.44 g, 10 mmol) and δ-valerolactone (0.50 g, 5 mmol) were dissolved in 5 mL of N,N-dimethylformamide. The mixture was heated under the protection of Ar to 96° C. and reacted for 12 hours. The reaction was terminated by adding water. The reaction solution was added into methanol. The precipitate was filtered and dried to a constant weight, obtaining 1.75 g of a copolymer of L-lactide and δ-valerolactone. The molar ratio of L-lactide and δ-valerolactone was 1.6:1. The number average molecular weight $M_n$ was 9,580. The polydispersity index PDI was 1.27.

The structure of the catalyst and the structure of the cyclic compound are as follows:

1,3-bis(2,4,6-trimethyl-phenyl) imidazole-2-carboxylic acid salt

Example 9

1,3-bis(o-methylphenyl)imidazole-2-carboxylic acid salt (21.9 mg, 75 μmol), benzyl alcohol (0.81 mg, 7.5 μmol), hexamethyldisiloxane (16.65 g, 75 mmol) were dissolved in 100 mL of tetrahydrofuran. The mixture was heated under the protection of the Ar heated to 50° C. and reacted for 30 hours. The reaction was terminated by adding hydrochloric acid. The reaction solution was condensed and added into methanol. The precipitate was filtered and dried to a constant weight to obtain 0.97 g of poly-hexamethyldisiloxane. The conversion was 69%. The number average molecular weight of polylactic acid $M_n$ was 1,220,000. The polydispersity index PDI was 1.47.

The structure of the catalyst and the structure of the cyclic compound are as follows:

1,3-bis(o-methylphenyl)  hexamethyldisiloxane
imidazole-2-carboxylic acid salt

Example 10

1,3-2-butyl imidazole-2-carboxylic acid salt (16.81 mg, 75 μmol), benzyl alcohol (0.54 g, 5 mmol), β-butyrolactone (0.86 g, 10 mmol) were added into a reaction vessel. The mixture was heated under the protection Ar to 120° C. The reaction was carried out in a molten mixture for 2 hours. The reaction was terminated by adding $CS_2$. The reaction mixture was dissolved in chloroform and the solution was then added into methanol. The precipitate was filtered and dried to a constant weight to obtain 0.78 g of poly β-butyrolactone. The conversion was 99%. The number average molecular weight $M_n$ was 172. The polydispersity index PDI was 1.00.

The structure of the catalyst and the structure of the cyclic compound are as follows:

1,3-2-butyl imidazole-2-carboxylic acid salt  β-butyrolactone

Example 11

1,3-bis(methylphenyl)imidazole-2-carboxylic acid salt (21.9 mg, 75 µmol), phenylethyl alcohol (12.21 mg, 100 µmol), L-lactide (1.44 g, 10 mmol) were added into a reaction vessel. The mixture was heated under Ar protection to 190° C. The reaction was carried out in a molten mixture for 30 minutes. The reaction was terminated by adding hydrochloric acid. The reaction mixture was dissolved in chloroform and added into ethanol. The precipitate was filtered and dried to a constant weight to obtain 1.2 g of L-polylactic acid. The conversion was 96%. The number average molecular weight $M_n$ as 8,090. The polydispersity index was PDI 1.15.

The structure of the catalyst and the structure of the cyclic compound are as follows:

1,3-bis(methylphenyl) imidazole-2-carboxylic acid salt

Lactide

Example 12

1,3-dicyclohexyl imidazole-2-carboxylic acid salt (27.62 mg, 100 µmol), tert-butanol (14.81 mg, 200 µmol), D, L-lactide (7.2 g, 50 mmol) were dissolved in 50 mL of toluene. The mixture was heated under the protection of Ar to 100° C. and reacted for 30 minutes. Acetic acid was added to terminate the reaction. The reaction mixture was added into methanol. The precipitate filtered and dried to a constant weight to obtain poly D, L-lactic acid. The conversion rate of 97%. The number average molecular weight $M_n$ was 25,600. The polydispersity index PDI was 1.09.

The structure of the catalyst and the structure of the cyclic compound are as follows:

1,3-dicyclohexyl imidazole-2-carboxylic acid salt

Lactide

Example 13

1-benzyl-3-methyl imidazoline-2-carboxylic acid salt (6.48 mg, 30 µmol), benzyl alcohol (16.21 mg, 150 µmol), trimethylene carbonate (1.02 g, 10 mmol) and L-lactide (1.44 g, 12 mmol) were added into reaction vessel. The mixture was heated under the protection of Ar to 200° C. The reaction was carried out in a molten mixture for 30 minutes. The reaction was terminated by adding oxygen. The reaction mixture was cooled and then dissolved in toluene and then added into ethanol. The precipitate was filtered and dried to a constant weight to obtain 1.9 g of a block copolymer of trimethylene carbonate and L-lactide. The molar ratio of methyl carbonate and L-lactide was 3.4:1. The number average molecular weight $M_n$ was 7,800. The polydispersity index PDI was 1.23.

The structure of the catalyst and the structure of the cyclic compound are as follows:

1-benzyl-3-methyl imidazoline-2-carboxylic acid salt    TMC    Lactide

Example 14

1,3-dimethyl imidazole-2-carboxylic acid salt (14.01 mg, 100 µmol), propanol (3.00 mg, 50 µmol), octamethyl cyclotetrasiloxane (2.96 g, 10 mmol) were dissolved in 20 mL of DMSO. The mixture was heated under the protection of Ar to 80° C. and reacted for 30 minutes. The reaction was terminated by adding $CO_2$. The reaction mixture to add into methanol. The precipitate was filtered and dried to a constant weight to obtain 1.6 g of poly octamethyl cyclotetrasiloxane siloxane. The conversion rate was 61%. The number average molecular weight $M_n$ is 19,200. The polydispersity index PDI was 1.24.

The structure of the catalyst and the structure of the cyclic compound are as follows:

1,3-dimethyl imidazole-2-carboxylic acid salt    octamethyl cyclotetrasiloxane

Example 15

1-phenylethyl-3-methylimidazolium-2-carboxylic acid salt (13.81 mg, 60 µmol), benzyl alcohol (6.48 mg, 60 µmol), a molecular weight of 2000 lactide oligomers (24.0 g, 12 mmol) were added into a reaction vessel. The mixture was heated under the protection of Ar to 130° C. The reaction was carried out in a molten mixture for 6 hours. Oxygen was added to terminate the reaction. The reaction mixture was cooled and then dissolved in toluene. The solution was added into ethanol. The precipitate was filtered and dried to a constant weight to obtain 18.0 g of polylactic acid. The conversion was 94% conversion. The number average molecular weight was $M_n$ 320,000. The polydispensity index PDI was 1.68.

The structure of the catalyst is as follows:

1-phenylethyl-3-methylimidazolium-
2-carboxylic acid salt

Example 16

1,3-Dicyclohexyl imidazole-2-carboxylic acid salt (27.62 mg, 100 μmol), tert-butanol (0.81 mg, 11 mmol), a molecular weight of 2000 lactide oligomers (24.0 g, 12 mmol), and β-butyrolactone (0.86 g, 10 mmol) were dissolved in 50 mL of toluene. The mixture was heated under the protection of Ar to 100° C. and reacted for 4 hours. Acetic acid was added to terminate the reaction. The reaction mixture was added into methanol. The precipitate was filtered and dried to a constant weight to obtain 21.9 g of a block copolymer of lactide and β-butyrolactone. The molar ratio of lactide and β-butyrolactone of 25:1. The number average molecular weight $M_n$ was 2,076. The polydispersity index PDI was 1.07.

The structure of the catalyst and the structure of the cyclic compound are as follows:

1,3-dicyclohexyl imidazole-   β-butyrolactone
2-carboxylic acid salt

Example 17

1,3-bis(methylphenyl)imidazoline-2-carboxylic acid salt (21.9 mg, 75 μmol), phenylethyl alcohol (12.21 mg, 100 μmol), ε-caprolactam (1.14 g, 10 mmol) were added into a reaction vessel. The reaction mixture was heated under the protection of Ar to 200° C. The reaction was carried out in a molten mixture for 30 minutes. Hydrochloric acid was added to terminate reaction. The reaction mixture was dissolved in chloroform and then added into ethanol. The precipitate was filtered and dried to a constant weight to obtain 0.78 g of poly ε-caprolactam. The conversion was 91%. The number average molecular weight $M_n$ was 8,700. The polydispersity index PDI was 1.39.

The structure of the catalyst and the structure of the cyclic compound are as follows:

1,3-bis(methylphenyl) imidazoline-   ε-caprolactam
2-carboxylic acid salt

Example 18

1,3-bis(o-methylphenyl)imidazoline-2-carboxylic acid salt (21.9 mg, 75 μmol), ethanol (1.73 mg, 37.5 μmol), hexamethyldisiloxane (2.22 g, 10 mmol) and ε-caprolactam (1.14 g, 10 mmol) were dissolved in 100 mL of tetrahydrofuran. The mixture was heated under the protection of Ar to 50° C. and reacted for 72 hours. Hydrochloric acid was added to terminate the reaction. The reaction mixture was concentrated and added into methanol. The precipitate was filtered and dried to a constant weight to obtain 2.76 g of a copolymer of hexamethyldisiloxane and ε-caprolactam copolymer. The molar ratio of hexamethyldisiloxane and ε-caprolactam was 1:5. The number average molecular weight $M_n$ was 40,900. The polydispersity index PDI was 1.45.

The structure of the catalyst and the structure of the cyclic compound are as follows:

1,3-bis(o-methylphenyl) imidazoline-   ε-caprolactam
2-carboxylic acid salt

Example 19

1-ethyl-3-methylimidazolium-2-carboxylic acid salt (30.81 mg, 200 μmol), benzyl alcohol (5.4 mg, 50 μmol), ε-caprolactam (1.14 g, 10 mmol) were added into a reaction vessel. The mixture was heated under the protection of Ar to 130° C. and the reaction was carried out in a molten mixture for 2 hours. Water was added to terminate the reaction. The reaction mixture was dissolved in chloroform and then added into ethanol. The precipitate was filtered and dried to a constant weight to obtain 1.08 g of poly ε-caprolactam. The conversion was 96%. The number average molecular weight $M_n$ was 17,700. The polydispersity index PDI was 1.17.

The structure of the catalyst and the structure of the cyclic compound are as follows:

1-ethyl-3-methylimidazolium-
2-carboxylic acid salt

ε-caprolactam

Example 20

1,3-bis(2,4,6-trimethyl-phenyl)imidazole-2-carboxylic acid salt (32.6 mg, 75 μmol), isopropanol (9.01 mg, 150 μmol), 1,3,5-trioxepane (1.04 g, 10 mmol), and δ-valerolactone (0.50 g, 5 mmol) were dissolved in 5 mL of N,N-dimethylformamide. The mixture was heated under the protection of Ar to 96° C. and reacted for 12 hours. Water was added to terminate the reaction. The reaction mixture was added into methanol. The precipitate was filtered and dried to a constant weight to obtain 0.8 g of a copolymer of 1,3,5-trioxepane and δ-valerolactone. The molar ratio between 1,3,5-trioxepane and δ-valerolactone in the product was 1:1.5. The number average molecular weight $M_n$ was 7,600. The polydispersity index PDI was 1.26.

The structure of the catalyst and the structure of the cyclic compound are as follows:

1,3-bis(2,4,6-trimethyl-phenyl) imidazole-2-
carboxylic acid salt 1,3,5-trioxepane      δ-valerolactone

Example 21

1,3-bis(2,4,6-trimethyl-phenyl)imidazole-2-carboxylic acid salt (32.6 mg, 75 μmol) and 1,3,5-trioxepane (0.39 g, 3.75 mmol) were dissolved in 5 mL of N,N-dimethylformamide. The mixture was heated under the protection of Ar to 120° C. and reacted for 30 hours. Water was added to terminate the reaction. The reaction mixture was added into methanol. The precipitate was filtered and dried to a constant weight to obtain 0.2 g of poly 1,3,5-trioxepane. The conversion was 88% conversion. The number average molecular weight $M_n$ was 3,750. The polydispersity index PDI was 1.69.

The structure of the catalyst and the structure of the cyclic compound are as follows:

1,3-bis(2,4,6-trimethyl-phenyl) imidazole-2-
carboxylic acid salt 1,3,5-trioxepane

Example 22

1-tertbutyl 4,5-dichloro-thiazolidine-2-carboxylic acid salt (19.05 mg, 75 μmol), phenylethal alcohol (12.21 mg, 100 μmol), L-lactide (1.44 g, 10 mmol) were added into a reaction vessel. The mixture was heated under the protection of Ar to 190° C. The reaction was carried out in a molten mixture for 30 minutes. Reaction was terminated by adding dilute hydrochloric acid. The reaction mixture was dissolved in chloroform then added into ethanol. The precipitate was filtered and dried to a constant weight to obtain 1.2 g poly L-lactic acid. The conversion rate was 90%. The number average molecular weight $M_n$ was 8,090. The polydispersity index PDI of 1.15.

The structure of the catalyst and the structure of the cyclic compound are as follows:

1-tert-butyl-4,5-dichloro-
thiazolidine-2-carboxylic
acid salt

Lactide

Example 23

1-(1-phenylethyl)thiazole-2-carboxylic acid salt (17.5 mg, 75 μmol), ethanol (1.73 mg, 37.5 μmol), hexamethyldisiloxane (2.22 g, 10 mmol) and ε-caprolactam (1.14 g, 10 mmol) were dissolved in 100 mL of tetrahydrofuran. The mixture was heated under the protection of Ar to 50° C. and reacted for 72 hours. Reaction was terminated by adding dilute hydrochloric acid. The reaction mixture was condensed then added into methanol. The precipitate was filtered and dried to a constant weight to obtain 2.76 g poly L-lactic acid. The conversion rate was 90%. The number average molecular weight $M_n$ was 40,900. The polydispersity index PDI of 1.15.

The structure of the catalyst and the structure of the cyclic compound are as follows:

1-(1-phenylethyl)thiazole-2-carboxylic acid salt

ε-caprolactam

Example 24

2,4,5-phenyl-1,2,4-triazole-3-carboxylic acid salt (34.14 mg, 100 μmol), tert-butanol (0.81 mg, 1 mmol), a lactide oligermer having a molecular weight of 2000 (24.0 g, 12 mmol), and β-butyrolactone (0.86 g, 10 mmol) were dissolved in 50 mL of toluene. The mixture was heated under the protection of Ar to 100° C. and reacted for 4 hours. The reaction was terminated by adding acetic acid. The reaction mixture was added into methanol. The precipitate was filtered and dried to a constant weight to obtain 21.9 g of a block copolymer of lactide and β-butyrolactone. The molar ratio of lactide and β-butyrolactone was 25:1. The number average molecular weight $M_n$ was 2,076. The polydispersity index PDI was 1.07.

The structure of the catalyst and the structure of the cyclic compound are as follows:

2,4,5-phenyl-1,2,4-triazole-3-carboxylic acid salt

β-butyrolactone

What is claimed is:
1. A method for ring-opening polymerization of cyclic compounds, comprising:
    providing a cyclic compound, wherein the cyclic compound is a macrocyclic oligomer, wherein the macrocyclic oligomer is obtained by prepolymerization of one or more cyclic monomers chosen from:

(1)

wherein A is $[\!\!-\!(CR^5R^6)\!-\!]_n$, in which n is an integer from 2 to 10; $R^5$ and $R^6$ are independently chosen from H, alkyl groups with 1 to 5 carbon atoms, and alkyl groups having 1 to 5 carbon atoms with substituents chosen from halogens or a hydroxyl group; and X is chosen from O and N;

polymerizing a reaction mixture comprising the macrocyclic oligomer, an alcohol initiator, and a carbon dioxide adduct of carbene, wherein the reaction mixture is solvent-free,
wherein the carbon dioxide adduct of carbene has a structure represented by formula (I)

(I)

wherein the dotted line together with the solid line parallel to the dotted line represents a single bond or a double bond;
$X^1$ is chosen from S and N;
$X^2$ is chosen from C and N;
$R^1$, $R^2$, $R^3$, and $R^4$ satisfy at least one of the following conditions:
(I) $R^1$ and $R^2$ are independently chosen from
hydrogen,
alkyl groups having 1 to 10 carbon atoms,
alkyl groups having 1 to 10 carbon atoms and one or more substituents chosen from halogens, a hydroxyl group, a phenyl group, and a cyano group,
cycloalkyl groups having 3 to 6 carbon atoms,
a halogen atom,
an adamantane group,
a phenyl group, and
a substituted phenyl group;
(II) $R^3$ and $R^4$ are independently chosen from
hydrogen,
a halogen atom,
a cyano group,
a hydroxyl group,
alkyl groups having 1 to 4 carbon atoms,
alkyl groups having 1 to 4 carbon atoms and one or more substituents chosen from halogens, a hydroxyl group, a phenyl group, and a cyano group,
a phenyl group, and
a substituted phenyl group;
(III) $R^3$ and $R^4$ are connected to form cycloalkyl or cycloalkenyl rings having 3 to 8 carbon atoms fused to the five-membered ring that contains $X^1$, $X^2$, and the nitrogen atom (in which case $X^2$ and the carbon atom in the 5-membered ring next to $X^2$ are also part of said cycloalkyl or cycloalkenyl rings);
(IV) $R^3$ and $R^4$ are connected to form a benzene ring fused to the five-membered ring that contains $X^1$, $X^2$, and the nitrogen atom (in which case $X^2$ and the carbon atom in the 5-membered ring next to $X^2$ are also part of said benzene ring); and
(V) $R^2$ and $R^3$ are connected to form a 5-membered or 6-membered N-heterocyclic ring having no substituent, which is fused to the five-membered ring that contains $X^1$, $X^2$, and the nitrogen atom (in which case $X^1$ and the carbon atom in the 5-membered ring connected to $R^3$ are also part of said 5-membered or 6-membered N-heterocyclic rings, $R^1$ is a group as defined in condition (I), and $R^4$ is a group as defined in condition (II)).
2. The method of claim 1, wherein the carbon dioxide adduct of carbene has a structure represented by formula (II)

(II)

wherein $R^1$ and $R^2$ are independently chosen from
hydrogen,
alkyl groups having 1 to 10 carbon atoms,
alkyl groups having 1 to 10 carbon atoms and one or more substituents chosen from halogens, a hydroxyl group, a phenyl group, and a cyano group,
cycloalkyl groups having 3 to 6 carbon atoms,
a halogen atom,
an adamantane group,
a phenyl group, and
a substituted phenyl group;
wherein $R^3$ and $R^4$ satisfy at least one of the following conditions:
(I) $R^3$ and $R^4$ are independently chosen from
hydrogen,
a halogen atom,
a cyano group,
a hydroxyl group,
alkyl groups having 1 to 4 carbon atoms,
alkyl groups having 1 to 4 carbon atoms and one or more substituents chosen from halogens, a hydroxyl group, a phenyl group, and a cyano group,
a phenyl group, and
a substituted phenyl group;
(II) $R^3$ and $R^4$ are connected to form cycloalkyl or cycloalkenyl rings having 3 to 8 carbon atoms fused to the imidazole ring; and
(III) $R^3$ and $R^4$ are connected to form a benzene ring fused to the imidazole ring.

3. The method of claim 1, wherein the carbon dioxide adduct of carbene has a structure represented by formula (III)

(III)

wherein $R^1$ and $R^2$ are independently chosen from
hydrogen,
alkyl groups having 1 to 10 carbon atoms,
alkyl groups having 1 to 10 carbon atoms and one or more substituents chosen from halogens, a hydroxyl group, a phenyl group, and a cyano group,
cycloalkyl groups having 3 to 6 carbon atoms,
a halogen atom,
an adamantane group,
a phenyl group, and
a substituted phenyl group;
wherein $R^3$ and $R^4$ satisfy at least one of the following conditions:
(I) $R^3$ and $R^4$ are independently chosen from
hydrogen,
a halogen atom,
a cyano group,
a hydroxyl group,
alkyl groups having 1 to 4 carbon atoms,
alkyl groups having 1 to 4 carbon atoms and one or more substituents chosen from halogens, a hydroxyl group, a phenyl group, and a cyano group,
a phenyl group, and
a substituted phenyl group; and
(II) $R^3$ and $R^4$ are connected to form a cycloalkyl or cycloalkenyl ring having 3 to 8 carbon atoms fused to the imidazoline ring.

4. The method of claim 1, wherein the carbon dioxide adduct of carbene has a structure represented by formula (IV)

(IV)

wherein $R^1$ is chosen from
hydrogen,
alkyl groups having 1 to 10 carbon atoms,
alkyl groups having 1 to 10 carbon atoms and one or more substituents chosen from halogens, a hydroxyl group, a phenyl group, and a cyano group,
cycloalkyl groups having 3 to 6 carbon atoms,
a halogen atom,
an adamantane group,
a phenyl group, and
a substituted phenyl group;
wherein $R^3$ and $R^4$ satisfy at least one of the following conditions:
(I) $R^3$ and $R^4$ can be the same or different and are chosen from
hydrogen,
a halogen atom,
a cyano group,
a hydroxyl group,
alkyl groups having 1 to 4 carbon atoms,
alkyl groups having 1 to 4 carbon atoms and one or more substituents chosen from halogens, a hydroxyl group, a phenyl group, and a cyano group,
a phenyl group, and
a substituted phenyl group;
(II) $R^3$ and $R^4$ are connected to form a cycloalkyl or cycloalkenyl ring having 3 to 8 carbon atoms fused to the thiazole ring; and
(III) $R^3$ and $R^4$ are connected to form a benzene ring fused to the thiazole ring.

5. The method of claim 1, wherein the carbon dioxide adduct has a structure represented by formula (V)

(V)

wherein $R^1$, $R^2$, and $R^3$ satisfy at least one of the following conditions:
(I) $R^1$ and $R^2$ are independently chosen from hydrogen,
alkyl groups having 1 to 10 carbon atoms,
alkyl groups having 1 to 10 carbon atoms and one or more substituents chosen from halogens, a hydroxyl group, a phenyl group, and a cyano group, cycloalkyl groups having 3 to 6 carbon atoms,
a halogen atom,
an adamantane group,
a phenyl group, and
a substituted phenyl group;
(II) $R^3$ is chosen from
hydrogen,
a halogen atom,
a cyano group,
a hydroxyl group,
alkyl groups having 1 to 4 carbon atoms,
alkyl groups having 1 to 4 carbon atoms and one or more substituents chosen from halogens, a hydroxyl group, a phenyl group, and a cyano group,
a phenyl group, and
a substituted phenyl group; and
(III) $R^2$ and $R^3$ are connected to form a 5-membered or 6-membered N-heterocyclic ring having no substituent, which is fused to the triazole ring, and $R^1$ is a group as defined in condition (I).

6. The method of claim 1, wherein the substituted phenyl group has one, two, or three substituents, wherein the substituents are independently chosen from halogens, a hydroxyl group, an alkoxy group, a cyano group, alkyl groups having 1-5 carbon atoms, and alkyl groups having 1-5 carbon atoms with one or more substituents chosen from halogens, a hydroxyl group, a phenyl group, and a cyano group.

7. The method of claim 1, wherein the macrocyclic oligomer contains 3 to 20 cyclic monomer units.

8. The method of claim 1, wherein a molar ratio of the carbon dioxide adduct of carbene and the cyclic compound is 1:50 to 1:1000.

9. The method of claim 8, wherein the molar ratio of the carbon dioxide adduct of carbene and the cyclic compound is 1:50 to 1:800.

10. The method of claim 9, wherein the molar ratio of the carbon dioxide adduct of carbene and the cyclic compound is 1:50 to 1:500.

11. The method of claim 1, wherein the alcohol initiator is chosen from methanol, ethanol, propanol, isopropanol, n-butanol, tert-butyl alcohol, benzyl alcohol, phenylethyl alcohol, ethylene glycol, diethylene glycol, or pentaerythritol.

12. The method of claim 11, wherein the molar ratio of the initiator and the cyclic compound is 1:2 to 1:10000.

13. The method of claim 12, wherein the molar ratio of the initiator and the cyclic compound is 1:50 to 1:500.

14. The method of claim 1, further comprising heating the reaction mixture to a temperature in the range of 60° C. to 180° C.

15. The method of claim 14, wherein the temperature is in the range of 100° C. to 160° C.

* * * * *